United States Patent
Lavertu et al.

(10) Patent No.: US 10,046,766 B2
(45) Date of Patent: Aug. 14, 2018

(54) TRACTION LOSS WARNING SYSTEM AND METHOD

(71) Applicant: General Electric Company, Schenectady, NY (US)

(72) Inventors: Thomas Michael Lavertu, Niskayuna, NY (US); Jennifer Lynn Jackson, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/188,089

(22) Filed: Jun. 21, 2016

(65) Prior Publication Data

US 2017/0361850 A1    Dec. 21, 2017

(51) Int. Cl.
| | |
|---|---|
| *B60W 30/18* | (2012.01) |
| *B60W 50/14* | (2012.01) |
| *B60W 40/10* | (2012.01) |
| *G07C 5/00* | (2006.01) |

(52) U.S. Cl.
CPC ...... *B60W 30/18172* (2013.01); *B60W 40/10* (2013.01); *B60W 50/14* (2013.01); *G07C 5/008* (2013.01)

(58) Field of Classification Search
CPC .......... B60W 50/14; B60W 30/18172; B60W 40/10; G07C 5/008
See application file for complete search history.

(56) References Cited

U.S. PATENT DOCUMENTS

| | | |
|---|---|---|
| 5,436,538 A | 7/1995 | Garvey et al. |
| 5,661,378 A | 8/1997 | Hapeman |
| 6,634,303 B1 | 10/2003 | Madsen et al. |
| 7,618,011 B2 | 11/2009 | Oleski et al. |
| 7,898,194 B2 | 3/2011 | Earleson |
| 8,310,176 B2 | 11/2012 | Earleson |
| 8,761,974 B2 | 6/2014 | Hawthorne et al. |
| 2003/0043059 A1* | 3/2003 | Miller, Jr. ............. G07C 5/008 340/989 |

(Continued)

OTHER PUBLICATIONS

Yamashita et al., "Development of a New Traction Control Method to Suppress Wheel-Slip of Electric Locomotives", Electrical Systems for Aircraft, Railway and Ship Propulsion (ESARS), IEEE, pp. 1-6, Oct. 16-18, 2012.

(Continued)

*Primary Examiner* — Rodney A Butler
(74) *Attorney, Agent, or Firm* — GE Global Patent Operation; Pabitra K. Chakrabarti

(57) ABSTRACT

A traction loss warning system includes a warning controller configured to be disposed onboard a first vehicle and to determine a location on a route where a loss in traction of the first vehicle occurred and a vehicle controller configured to be disposed onboard a second vehicle, the vehicle controller configured to control movement of the second vehicle along the route. The warning controller also is configured to communicate a warning signal that notifies the second vehicle of the location where the loss in traction of the first vehicle occurred. The vehicle controller is configured to change the movement of second vehicle along the route during travel of the second vehicle over the location responsive to receiving the warning signal from the warning controller.

20 Claims, 3 Drawing Sheets

(56) References Cited

U.S. PATENT DOCUMENTS

2007/0173990 A1    7/2007  Smith et al.
2008/0162027 A1*  7/2008  Murphy ................ B60W 50/14
                                                                                 701/117
2014/0210644 A1*  7/2014  Breed ................... G01S 17/936
                                                                                 340/905

OTHER PUBLICATIONS

Wang et al., "Locomotive Wheel Slip Detection Based on Multi-Rate State Identification of Motor Load Torque", Journal of the Franklin Institute, Volume No. 353, Issue No. 2, pp. 521-540, Jan. 2016.

* cited by examiner

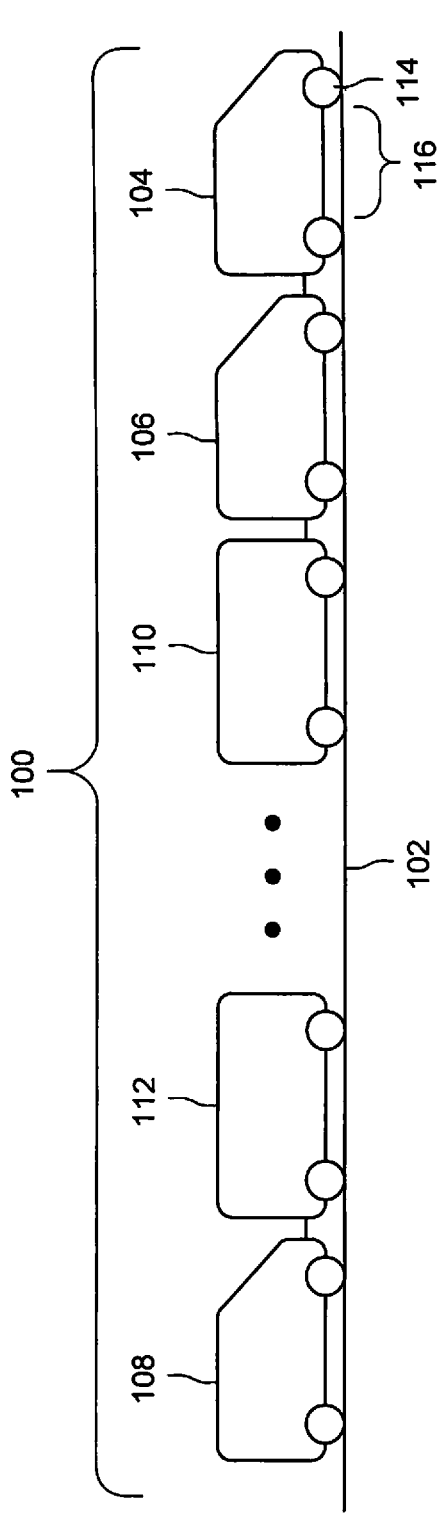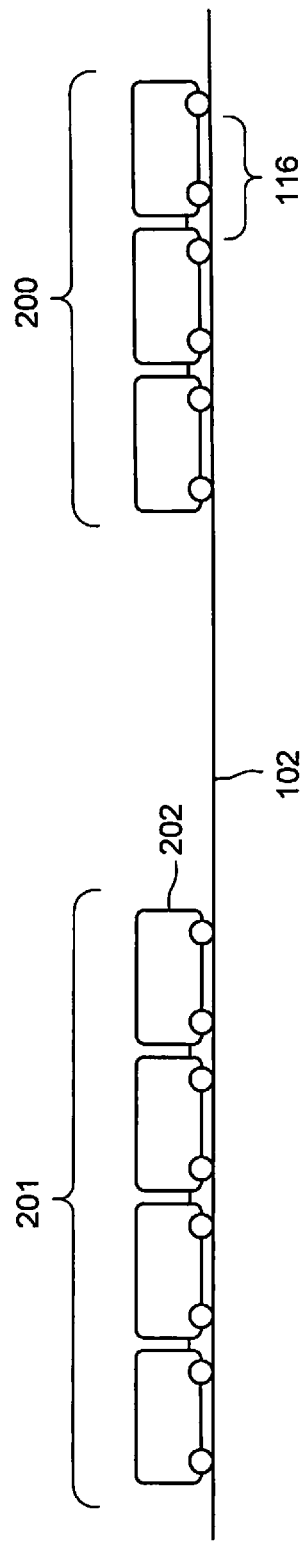

TRACTION LOSS WARNING SYSTEM AND METHOD

FIELD

Embodiments of the inventive subject matter described herein relate to monitoring and/or controlling movement of a vehicle.

BACKGROUND

Vehicles traveling over land-based routes may experience losses in traction, such as wheel slip, travel over hazardous conditions (e.g., ice or moisture), travel over potholes, etc. These losses in traction may occur when adhesion between a surface of a route being traveled upon and one or more wheels of a vehicle temporarily or momentarily decreases, and the wheel slips relative to the route. The wheel may rotate at a faster speed during the loss in traction than prior to or subsequent to the loss in traction.

In response to detecting the loss in traction, some vehicles quickly reduce the tractive effort being generated by the vehicle to rotate the wheels. But, if the tractive effort being generated by the vehicle is not quickly reduced during or in response to detection of the loss in traction, the loss in traction may worsen and the propulsion of the vehicle may be significantly reduced. Moreover, slippage of the wheel on the route may damage the wheel and/or the route and cause an operator of the vehicle to lose control of the vehicle and slide off of the route.

The loss in traction may occur in locations along the route having foreign substances on the route, such as moisture, ice, oil, leaves, or other substances. But, it can be difficult to predict or determine which locations along the route where the loss in traction will or is likely to occur.

BRIEF DESCRIPTION

In one embodiment, a system includes a warning controller configured to determine a location on a route where a loss in traction of a first vehicle occurred. The warning controller also is configured to communicate a warning signal to a second vehicle that notifies the second vehicle of the location where the loss in traction of the first vehicle occurred. The warning signal is communicated to the second vehicle so the second vehicle changes movement of the second vehicle during travel over the location on the route to reduce a subsequent loss in traction of the second vehicle relative to the loss in traction experienced by the first vehicle.

In one embodiment, a system includes a warning controller configured to be disposed onboard a first vehicle and to determine a location on a route where a loss in traction of the first vehicle occurred and a vehicle controller configured to be disposed onboard a second vehicle, the vehicle controller configured to control movement of the second vehicle along the route. The warning controller also is configured to communicate a warning signal that notifies the second vehicle of the location where the loss in traction of the first vehicle occurred. The vehicle controller is configured to change the movement of second vehicle along the route during travel of the second vehicle over the location responsive to receiving the warning signal from the warning controller.

In one embodiment, a method includes monitoring movement of a first vehicle on a route, determining a location on the route where a loss in traction of the first vehicle occurred, communicating the location on the route where the loss in traction occurred to a second vehicle and responsive to receiving the location at the second vehicle, changing movement of the second vehicle during subsequent travel over the location.

BRIEF DESCRIPTION OF THE DRAWINGS

Reference is now made briefly to the accompanying drawings, in which:

FIG. 1 illustrates a vehicle system traveling over a route according to one embodiment;

FIG. 2 illustrates plural vehicle systems traveling over the route according to one embodiment;

DETAILED DESCRIPTION

Figure 3:
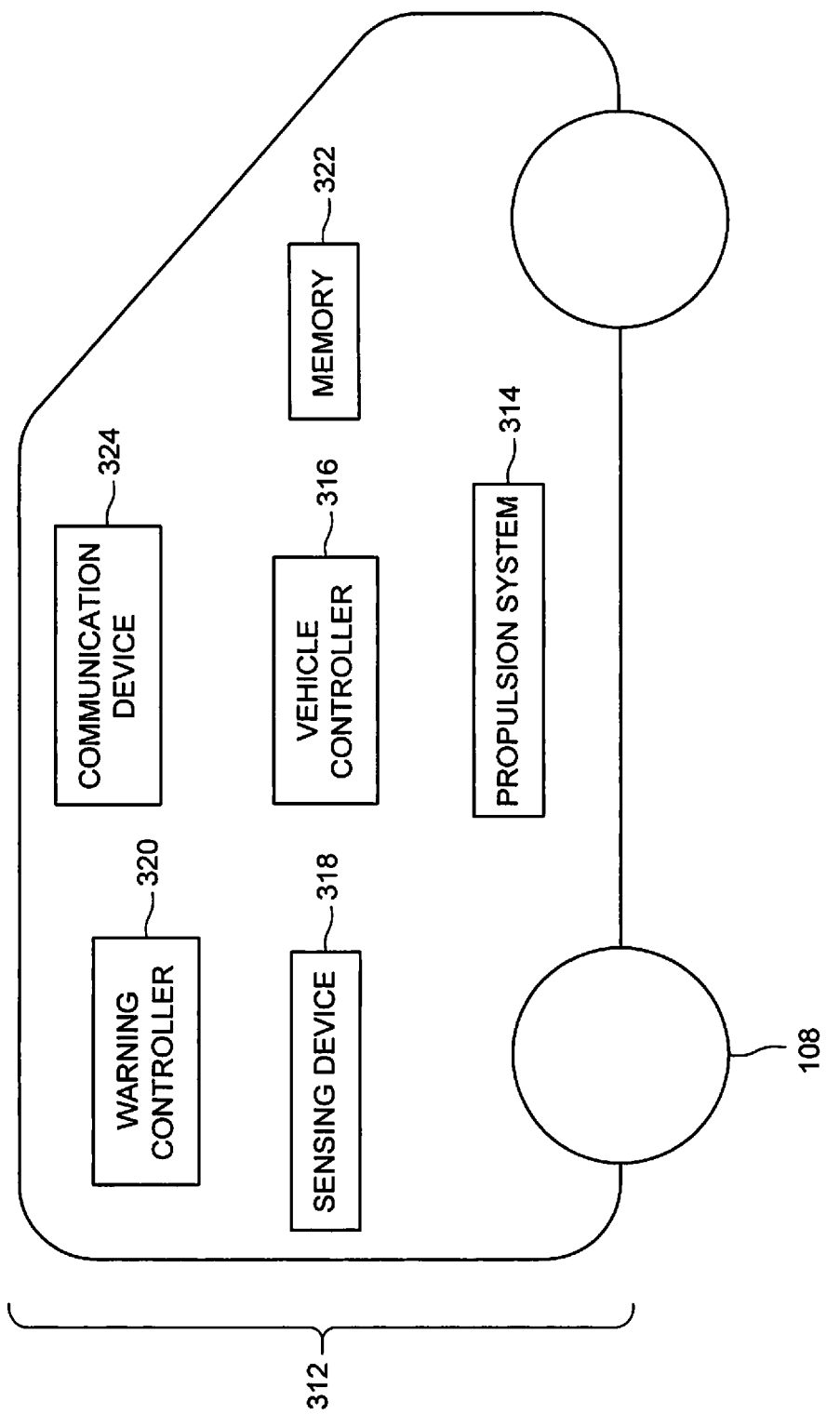
FIG. 3 illustrates a vehicle having a traction loss warning system according to one embodiment.

In accordance with one or more embodiments described herein, systems and methods are provided for actively controlling vehicles for a loss in traction through communicatively connected vehicles. The vehicles may be included in the same vehicle consist of mechanically coupled vehicles, or may be mechanically separate vehicles. While the description herein focuses on rail vehicles, not all embodiments of the inventive subject matter are limited to rail vehicles. One or more embodiments may be used with other types of off-highway vehicles (e.g., vehicles that are not designed and/or are not legally permitted to travel on public roadways), automobiles, or other vehicles that may experience losses in traction. During movement of a vehicle along a route, the vehicle may encounter a loss in traction and note the location on the route where the loss in traction occurred. This information can then be stored and/or communicated to one or more other vehicles that subsequently travel on the same route. The subsequent vehicle(s) can then actively control propulsion of the vehicles to prevent, avoid, or reduce the loss in traction condition as the vehicle(s) approach the location on the route where the loss in traction was identified.

FIG. 1 illustrates a vehicle system 100 traveling over a route 102 according to one embodiment. The vehicle system 100 includes multiple vehicles 104, 106, 108, 110, 112 traveling together. The vehicles may be mechanically coupled with each other. The vehicles 104, 106, 108 represent propulsion-generating vehicles, such as locomotives, trucks, etc. The vehicles 108, 110 represent non-propulsion-generating vehicles, such as rail cars, trailers, etc. Alternatively, the vehicle system 100 may only include a single vehicle. The route 102 represents a surface over which the vehicle system 100 travels, such as a track, road, etc. The number and arrangement of the vehicles shown in FIG. 1 are provided as one non-limiting example of the subject matter described herein. The ellipsis shown in FIG. 1 indicates that one or more additional vehicles may be included in the vehicle system 100.

During travel over the route 102, one or more of the propulsion-generating vehicles may detect a loss in traction. For example, the vehicle 104 may detect when the rotational speed of a wheel 114 or set of wheels 114 connected to the same axle increases relative to the rotational speed of other wheels 114 of the same vehicle 104 or increases without a motor or other propulsion-generating device increasing the torque applied to the axle or wheels 114. A location 116 on or along the route 102 where the loss in traction occurred may be determined and communicated to one or more other vehicles 104, 106, 108 in the same vehicle system 100. For example, the vehicle 104 may communicate the location 116 to one or more of the vehicles 106, 108 via one or more wired and/or wireless connections to notify the vehicles 106 and/or 108.

As the vehicles 106, 108 subsequently travel toward the location 116, the vehicles 106, 108 may change tractive operations in anticipation of reaching the location 116. For example, the vehicles 106, 108 may decrease the torque applied to the axles and/or wheels of the corresponding vehicle 106, 108 when that vehicle 106, 108 approaches or reaches the location 116 (e.g., within a designated distance of the location 116, such as ten meters, thirty meters, or the like). Because the vehicles 106, 108 have been notified of the location 116 of the loss in traction before the vehicles 106, 108 reach the location 116, the vehicles 106, 108 have sufficient time to decrease the torque applied to the axles and/or wheels 108 of the vehicles 104B, 104C. Decreasing this torque can eliminate or reduce the extent of the loss in traction when the corresponding vehicle 106, 108 travels over the location 116, even if the cause of the loss in traction (e.g., a foreign substance on the route 102) remains on the route 102. The torque can be decreased for a single wheel 114 or for multiple wheels 114 (e.g., all wheels in the vehicle).

Subsequent to traveling over the location 116, the vehicles 106, 108 can increase the torque applied to the axles and/or wheels 114, such as to the torque applied to the axles and/or wheels 114 prior to reaching the location 116. As a result, the vehicles 104B, 104C can travel over the location 116 without experiencing the same loss in traction as the vehicle 104 while only temporarily decreasing the torque applied to the axles and/or wheels 114 of the vehicles 106, 108, and/or decreasing the speed of the vehicles 106, 108.

FIG. 2 illustrates plural vehicle systems 200, 201 traveling over the route 102 according to one embodiment. Each of the vehicle systems 200, 201 may be similar to the vehicle system 100 shown in FIG. 1. For example, each of the vehicle systems 200, 201 may include one or more vehicles 202, which can represent at least one propulsion-generating vehicles and optionally one or more non-propulsion-generating vehicles. The number and arrangement of the vehicles 202 in the vehicle systems 200 shown in FIG. 2 are provided as one non-limiting example of the subject matter described herein.

During travel over the route 102, one or more of the vehicles in the vehicle system 200 may detect a loss in traction at the location 116 along the route 102. The location 116 on or along the route 102 where the loss in traction occurred may be determined and communicated to one or more other vehicles in the other vehicle system 201. For example, a vehicle in the vehicle system 200 may communicate the location 116 to one or more of the vehicles in the other vehicle system 201 via one or more wired and/or wireless connections to notify the vehicle system 201. Optionally, the vehicle system 200 may communicate the location 116 to more vehicle systems, such as vehicle systems within a communication range of the vehicle system 200, vehicle systems currently traveling toward the location 116 on the route 102, and/or vehicle systems scheduled to travel toward the location 116 on the route 102. While the vehicle systems 200, 201 shown in FIG. 2 are traveling on the route 102 in the same direction, optionally, the vehicle systems 200, 201 may be traveling in opposite directions. For example, the vehicle system 200 may travel toward the right in FIG. 2 and detect the location 116 of the loss in traction. At a later time when the vehicle system 200 is no longer on the route 102, the vehicle system 201 may travel toward the left in FIG. 2 toward the location 116.

As the vehicle system 201 subsequently travels toward the location 116, the propulsion-generating vehicles in the vehicle system 201 may change tractive operations in anticipation of reaching the location 116. For example, the propulsion-generating vehicles in the vehicle system 201 may decrease the torque applied to the axles and/or wheels of the vehicles in the vehicle system 201 and/or decrease the speed of the vehicle system 201 when the propulsion-generating vehicles in the vehicle system 201 approach or reach the location 116 (e.g., within a designated distance of the location 116, such as ten meters, thirty meters, or the like). Because the propulsion-generating vehicles in the vehicle system 201 have been notified of the location 116 of the loss in traction before the propulsion-generating vehicles in the vehicle system 201 reach the location 116, the propulsion-generating vehicles in the vehicle system 201 have sufficient time to decrease the torque applied to the axles and/or wheels 114 of the propulsion-generating vehicles in the vehicle system 201. Decreasing this torque and/or decreasing the speed of the vehicle system 201 can eliminate or reduce the extent of the loss in traction when the corresponding propulsion-generating vehicle in the vehicle system 201 travels over the location 116, even if the cause of the loss in traction (e.g., a foreign substance on the route 102) remains on the route 102.

FIG. 3 illustrates a vehicle 304 having a traction loss warning system 312 according to one embodiment. The vehicle 304 may represent one or more of the propulsion-generating vehicles shown in FIG. 1, and may be included in the vehicle systems shown in FIGS. 1 and/or 2. The vehicle 304 includes a propulsion system 314, which represents one or more engines, motors, alternators, generators, brakes, etc., and which operates to control movement of the vehicle 304. The propulsion system 314 can be coupled with the axles and wheels 308 of the vehicle 304, such as by a transmission, gears, etc. The propulsion system 314 causes the axles and wheels 308 to rotate by generating a torque that is applied to the wheels 308.

A vehicle controller 316 controls operation of the vehicle 304. The controller 316 can represent hardware circuitry that includes and/or is connected with one or more processors (e.g., microprocessors, field programmable gate arrays, and/or integrated circuits) that control operation of the vehicle 304. For example, the vehicle controller 316 can generate control signals (autonomously and/or based on input provided from a human operator via a wheel, throttle, or other input device) that are communicated to the propulsion system 314 to control how the propulsion system 314 moves the vehicle 304.

The warning system 312 includes a sensing device 318. The sensing device 318 includes one or more sensors that measure, sense, or otherwise determine data that can be used to detect loss in traction. In one embodiment, the sensing device 318 includes one or more speed sensors, such as wheel speed sensors or vehicle speed sensors, other types of tachometers, global positioning system (GPS) receivers, etc. Optionally, the sensing device 318 can include one or more sensors that measure or determine the torque applied to the wheels 308, such as torque sensors, current sensors that measure the current supplied to motors that rotate the wheels 308 (e.g., where the torque can be estimated or otherwise derived from the current supplied to the motors). The sensing device 318 shown in FIG. 3 may represent more than one sensor.

A warning controller 320 of the system 312 identifies losses in traction. The warning controller 320 represents hardware circuitry that includes and/or is connected with one or more processors (e.g., microprocessors, field programmable gate arrays, and/or integrated circuits) that receives and examines the data provided by the sensing device 318 to determine when a loss in traction occurs and the location 116 (shown in FIG. 1) of where the loss in traction occurred. The controller 320 may examine rotational speeds of the wheels 308. When the rotational speed of a wheel 308 or wheels 308 connected to the same axle increases without a corresponding increase in the rotational speeds of one or more, or all, other wheels, the controller 320 may determine that a loss in traction has occurred. As another example, when the rotational speed of a wheel 308 or wheels 308 connected to the same axle increases without a corresponding increase in the torque applied to the axle and/or wheels 308, the controller 320 may determine that a loss in traction has occurred. As another example, when the rotational speed of a wheel 308 or wheels 308 connected to the same axle increases without a corresponding increase in the amount of current supplied to a motor that rotates the axle and/or wheels 308, the controller 320 may determine that a loss in traction has occurred. As another example, when the rotational speed of one or more wheels 308 does not correspond with the moving speed of the vehicle 304 (e.g., a product of the circumference of a rotating wheel 308 and the rotational speed of the same wheel 308 is greater than the moving speed of the vehicle 304), the controller 320 may determine that a loss in traction occurred. The moving speed of the vehicle 304 may be determined from a global positioning system receiver or other sensor of the sensing device 318.

Responsive to the warning controller 320 determining that a loss in traction has occurred, the warning controller 320 may determine the location 116 where the loss in traction occurred and/or was detected. The warning controller 320 can determine the location 116 from data provided by the sensing device 318, such as from a global positioning system receiver, a LIDAR sensor, a wireless device that triangulates or receives the location of the vehicle 304, a dead reckoning system, etc. In one embodiment, the warning controller 320 can store the location 116 of the loss in traction in a memory 322 of the system 312, which can represent a computer hard drive or computer-readable disk. Alternatively, the location 116 of the loss in traction is not stored onboard the vehicle 304.

The warning controller 320 can communicate a warning signal to one or more other vehicles of the same vehicle system 100 and/or a different vehicle system 200, as described above. Optionally, the warning signal may be communicated to an off-board location, such as a centralized server at an off-board facility. Optionally, the warning signal may cause an output device (e.g., a monitor, light, audible alarm, etc.) onboard the other vehicle or vehicle system to warn the operator of the other vehicle or vehicle system of the location 116 of the loss in traction. This warning signal may include or represent the location 116 of the loss in traction. A communication device 324 of the warning system 312 and/or vehicle 304 may communicate the location 116 of the loss in traction. The communication device 324 includes hardware circuitry that can communicate the location 116 to another vehicle via one or more wired and/or wireless connections. The communication device 324 may include one or more antennas, modems, etc., and associated transmitting or transceiving circuitry to communicate the location 116 to another vehicle.

The warning controller 320 can direct the communication device 324 to communicate the location 116 of the loss in traction responsive to identifying the location 116. For example, as each instance of loss in traction is identified, the controller 320 can determine and communicate the location 116 of the loss in traction. Optionally, the controller 320 may store the location 116 in the memory 322, and the location(s) 116 of loss in traction can be communicated at a later time, such as when another vehicle system is approaching or is scheduled to travel over the location 116, when another vehicle system is within communication range of the communication device 324, etc. Optionally, the controller 320 can communicate the location 116 of the loss in traction to a scheduling facility and may direct the scheduling facility to alter the schedule of one or more other vehicles or vehicle systems to avoid the location 116, to reduce speed during travel over the location 116, and/or to avoid accelerating during travel over the location 116. The controller 320 can communicate the location 116 of the loss in traction to a repair facility and may direct the repair facility to inspect, clean, and/or repair the route 102 at the location 116.

The vehicle controller 316 may receive the location 116 of a loss in traction, as communicated from another vehicle or vehicle system, via the communication device 324. The vehicle controller 316 can implement one or more responsive actions, such as directing the propulsion system 314 to reduce speed, avoid acceleration, reduce torque applied to the wheels 308, etc., when the vehicle 304 travels over the location 116. The vehicle controller 316 can direct the propulsion system 314 to increase speed and/or torque after the vehicle 304 has traveled over the location 116. This can avoid or reduce the magnitude of the loss in traction experienced by the vehicle 304 that has been notified, in advance, of the location 116 where loss in traction was detected.

Figure 4:
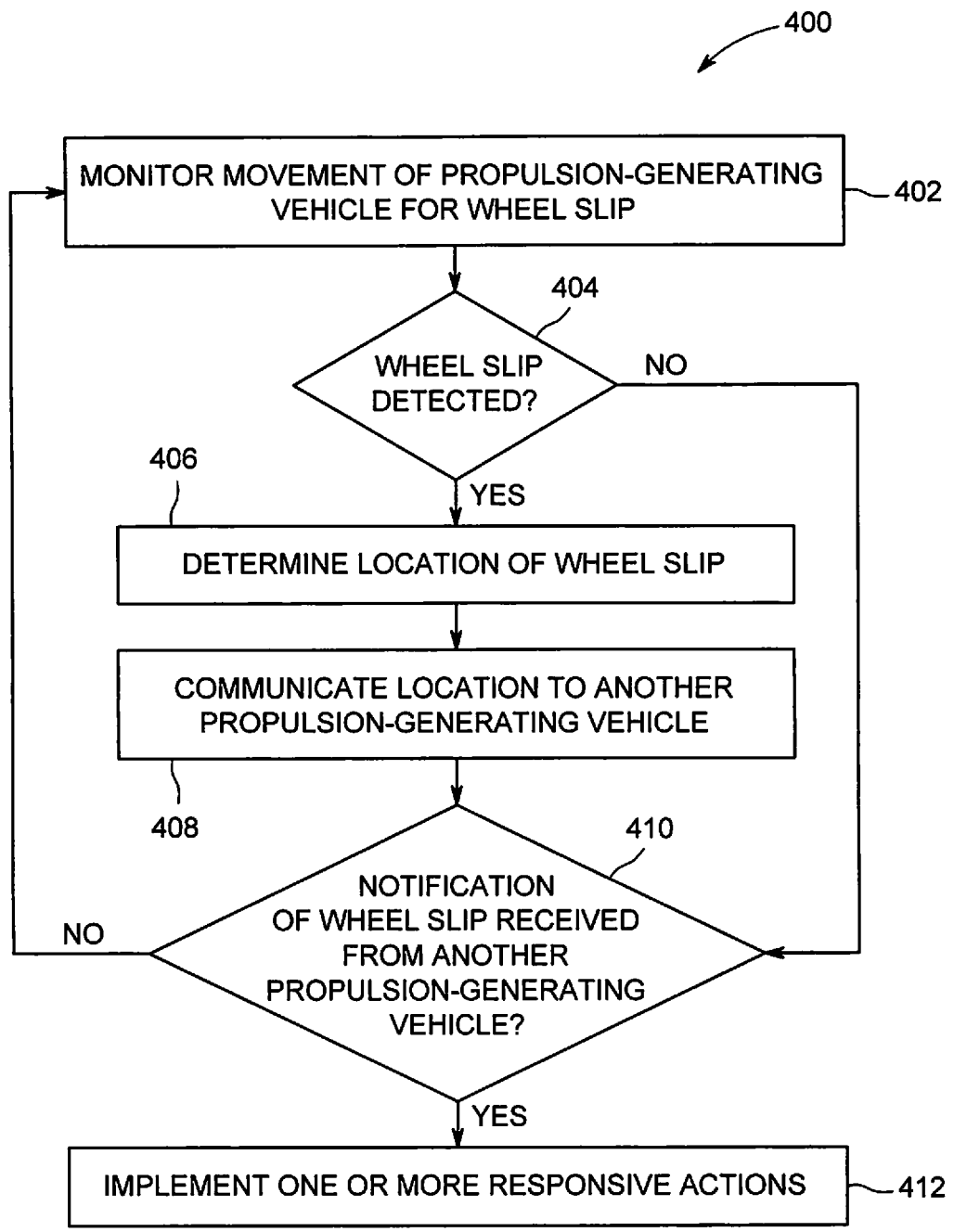
FIG. 4 illustrates a flowchart of one embodiment of a method for detecting and warning one or more other vehicles of a loss in traction on a route.

FIG. 4 illustrates a flowchart of one embodiment of a method 400 for detecting and warning one or more other vehicles of a loss in traction on a route. The method 400 may represent, or may be used to create, a software program or algorithm that directs the operations of the warning controller 320 and/or the vehicle controller 316. At 402, movement of a propulsion-generating vehicle is monitored for losses in traction. As described above, this monitoring can involve examining changes in rotational speeds of wheels of the vehicle, comparing the product of the circumference of a wheel and the rotational speed of the wheel with a moving speed of the vehicle, examining the torque applied to the wheel, etc. The warning controller 320 can monitor the movement of the vehicle using the data provided by the sensing device 318.

At 404, a determination is made as to whether a loss in traction has occurred or is occurring. The warning controller 320 can examine the data (e.g., the rotational speed of the wheel, the moving speed of the vehicle, the torque applied to the wheel, etc.) to determine whether a loss in traction has occurred, as described above. If a loss in traction is detected, then flow of the method 400 can proceed toward 406. Otherwise, flow of the method 400 can proceed toward 410. Alternatively, flow of the method 400 can return toward 402 if a loss in traction is not detected at 404.

At 406, the location of where the loss in traction occurred or was detected is determined. As described above, the warning controller 320 can determine this location from information provided from the sensing device 318, such as a global positioning system receiver, a dead reckoning system, a wireless device that triangulates the location, etc. At 408, the location of where the loss in traction was detected is communicated to another vehicle. The warning controller 320 can provide the location to the communication device 324 and direct the communication device 324 to send the location to another vehicle, as described above. Flow of the method 400 may proceed toward 410 or optionally may return toward 402.

At 410, a determination is made as to whether notification of a loss in traction is received from another vehicle. For example, the vehicle controller 316 can examine information received by the communication device 324 from an off-board location (e.g., another vehicle) to determine if a location of a loss in traction detected by the other vehicle was received. If a notification of a loss in traction was received, then flow of the method 400 can proceed toward 412. If such a notification is not received, then flow of the method 400 may return toward 402. Optionally, flow of the method 400 may remain at 410 until a notification of a loss in traction is received from an off-board location.

While the description herein focuses on the location of the detected loss in traction being communicated from one vehicle to another, optionally, the location of the loss in traction may be provided to a vehicle from another off-board location, such as a dispatch facility, scheduling facility, wayside device, etc. For example, a vehicle that detects a loss in traction may communicate the location of the loss in traction to an off-board device, such as a dispatch facility, scheduling facility, wayside device, etc. The off-board device may then communicate the location of the loss in traction to one or more other vehicles to warn these vehicles of the location of the detected loss in traction. In one example, vehicles that detect loss in traction can communicate the locations of the losses in traction to wayside devices, which can communicate the locations of the wheel slips to other vehicles as the other vehicles come within the communication range of the wayside devices.

At 412, one or more responsive actions are implemented. For example, responsive to receiving the location of a wheel slip from an off-board location (e.g., another vehicle or another source), the vehicle controller 316 may direct the propulsion system 314 to reduce throttle, to decelerate, to avoid accelerating, or to reduce torque applied to one or more wheels during travel over the location of the loss in traction. Optionally, the responsive action may be changing the route traveled upon and/or which segment or portion of the route is traveled upon. For example, if a vehicle is traveling toward a location of a loss in traction previously experienced by another vehicle, the vehicle traveling toward the location can move onto another route that does not include the location of the loss in traction or can move into another lane of the route. Flow of the method 400 may return toward 402. Optionally, flow of the method 400 may return toward 410 or terminate.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. At least one of the following claims may represent a claim to inventive subject matter of this patent application. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f) unless and until such claim limitations expressly use the phrase "means for" followed by a statement of function void of further structure.

This written description uses examples to disclose several embodiments of the inventive subject matter and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A system comprising:
   a first vehicle,
   a second vehicle and
   one or more third vehicles,
wherein the first and second vehicles are propulsion-generating vehicles; and wherein the one or more third vehicles are non-propulsion-generating vehicles, wherein the first vehicle is mechanically connected to the second vehicle or mechanically connected to one or more third vehicles wherein at least one of the third vehicles is mechanically connected to the second vehicle;
  a warning controller configured to determine a location on a route where a loss in traction of the first vehicle occurred, the warning controller also configured to communicate a warning signal to the second vehicle that notifies the second vehicle of the location where the loss in traction of the first vehicle occurred,
  wherein the warning signal is communicated to the second vehicle whereby responsive to the warning signal, the second vehicle is configured to change movement of the second vehicle during travel over the location on the route to reduce a subsequent loss in traction of the second vehicle relative to the loss in traction experienced by the first vehicle.

2. The system of claim 1, further comprising a sensing device configured to determine data representative of one or more of a rotational speed of a wheel, a torque applied to the wheel, an electric current supplied to a motor that rotates the wheel, or a moving speed of the first vehicle, wherein the warning controller is configured to receive the data that is determined by the sensing device and to determine whether the loss in traction occurred based on the data that is received.

3. The system of claim 1, further comprising a vehicle controller configured to control movement of the first vehicle, wherein the vehicle controller is configured to one or more of:
  reduce a rotational speed of a wheel,
  reduce a torque applied to the wheel,
  reduce or avoid acceleration of the first vehicle, or
  reduce an electric current supplied to a motor that rotates the wheel responsive to the vehicle controller receiving a different warning signal communicated from another vehicle and indicating another location of another loss in traction.

4. The system of claim 1, wherein the warning controller is configured to be disposed onboard the first vehicle.

5. A system comprising:
  a first vehicle and a second vehicle wherein the first vehicle is mechanically connected to the second vehicle;
  a warning controller configured to be disposed onboard a first vehicle and configured to determine a location on a route where a loss in traction of the first vehicle occurred; and
  a vehicle controller configured to be disposed onboard a second vehicle, the vehicle controller configured to control movement of the second vehicle along the route,
  wherein the warning controller also is configured to communicate a warning signal that notifies the vehicle controller disposed onboard the second vehicle of the location where the loss in traction of the first vehicle occurred,
  wherein the vehicle controller is configured to receive the warning signal and to change the movement of second vehicle along the route during travel of the second vehicle over the location responsive to receiving the warning signal from the warning controller.

6. The system of claim 5, wherein the first and second vehicles are mechanically coupled or interconnected with each other in a vehicle system.

7. The system of claim 5, further comprising a sensing device configured to determine data representative of one or more of a rotational speed of a wheel of the first vehicle, a torque applied to the wheel of the first vehicle, an electric current supplied to a motor that rotates the wheel of the first vehicle, or a moving speed of the first vehicle, wherein the warning controller is configured to receive the data that is determined by the sensing device and to determine whether the loss in traction occurred based on the data that is received.

8. The system of claim 5, wherein the vehicle controller is configured to one or more of reduce a rotational speed of a wheel of the second vehicle, reduce a torque applied to the wheel of the second vehicle, reduce or avoid acceleration of the second vehicle, or reduce an electric current supplied to a motor that rotates the wheel of the second vehicle responsive to the vehicle controller receiving the warning signal from the warning controller.

9. The system of claim 5, wherein the warning controller is configured to direct a communication device disposed onboard the first vehicle to communicate the warning signal to the second vehicle to notify an operator of the second vehicle where the loss in traction occurred.

10. The system of claim 5, wherein the warning controller is configured to direct a communication device disposed onboard the first vehicle to communicate the warning signal to an off-board device that communicates the warning signal to the vehicle controller disposed onboard the second vehicle.

11. A method comprising;
  monitoring movement of a first vehicle on a route;
  determining a location on the route where a loss in traction of the first vehicle occurred;
  communicating the location of the route where the loss in traction occurred to a vehicle controller onboard a second vehicle mechanically interconnected to the first vehicle; and
  responsive to receiving the location at the second vehicle, the vehicle controller changes movement of the second vehicle during subsequent travel over the location.

12. The method of claim 11, wherein communicating the location includes sending the location from the first vehicle to the vehicle controller disposed onboard the second vehicle within a vehicle system that includes at least the first and second vehicles.

13. The method of claim 11, further comprising obtaining data representative of one or more of a rotational speed of a wheel of the first vehicle, a torque applied to the wheel of the first vehicle, an electric current supplied to a motor that rotates the wheel of the first vehicle, or a moving speed of the first vehicle, wherein the location on the route where the loss in traction occurred is determine based on the data.

14. The method of claim 11, wherein changing the movement of the second vehicle during subsequent travel over the location includes one or more of reducing a rotational speed of a wheel of the second vehicle, reducing a torque applied to the wheel of the second vehicle, reducing or avoiding acceleration of the second vehicle, or reducing an electric current supplied to a motor that rotates the wheel of the second vehicle.

15. The method of claim 11, wherein the location is communicated from the first vehicle to the vehicle controller disposed on board the second vehicle.

16. The method of claim 11, wherein the location is communicated from the first vehicle to an off-board device and from the off-board device to the vehicle controller disposed onboard the second vehicle.

17. The method of claim 11 wherein the first vehicle is mechanically coupled and/or interconnected with the second vehicle.

18. The method of claim 11 wherein each of the first vehicle and second vehicle is a propulsion-generating vehicle and wherein the first vehicle is mechanically connected to the second vehicle or mechanically connected to one or more third vehicles wherein at least one of the third vehicles is mechanically connected to the second vehicle, wherein the third vehicle is a non-propulsion-generating vehicle.

19. The system of claim 1, further comprising a vehicle controller configured to be disposed onboard the second vehicle, wherein the vehicle controller is configured to control movement of the second vehicle along the route.

20. The system of claim 1 wherein each of the first and second vehicle is a locomotive and the one or more third vehicles are rail cars.

* * * * *